A. S. OGDEN.
Electric-Battery Connection.
No. 55,892. Patented June 26, 1866.
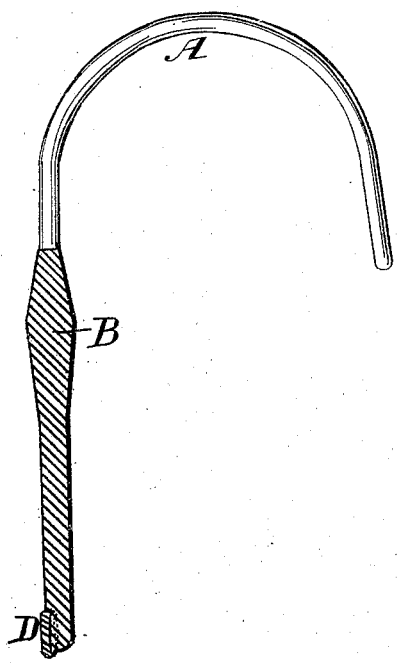
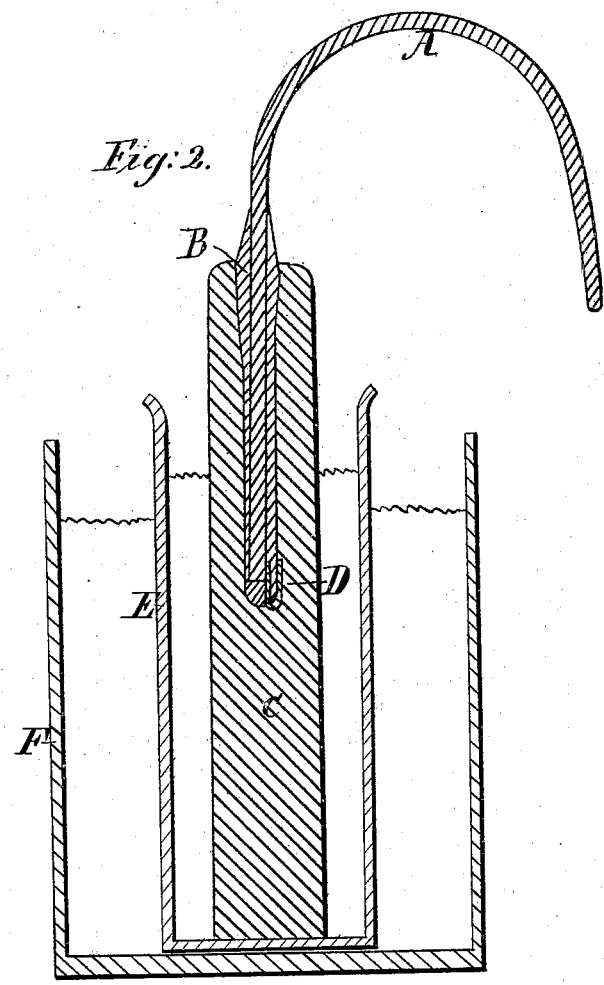
Witnesses:
Daniel C Colby
Louis Maury
Inventor:
Aaron S. Ogden

United States Patent Office.

AARON S. OGDEN, OF NEWARK, NEW JERSEY.

IMPROVEMENT IN CARBON-BATTERY CONNECTIONS.

Specification forming part of Letters Patent No. 55,892, dated June 26, 1866.

*To all whom it may concern:*

Be it known that I, AARON S. OGDEN, of Newark, Essex county, in the State of New Jersey, have invented certain new and useful Improvements in Connections for Galvanic Batteries; and I do hereby declare the following to be a full and exact description of the same, reference being had to the drawings that accompany and form a part of this specification, in which—

Figure I is a view of those parts to which my improvements relate; Fig. II, a sectional view, showing the parts in position.

A represents the ordinary connecting-wire; B, an inoxidizable covering to a portion of the wire A; C, a block of prepared carbon; D, a small piece of platina firmly attached to the wire A, as in Fig. I; E, the porous cup in which the carbon is placed, as in Fig. II; F, the outer cup of the battery.

The object of my invention is to provide against the oxidation of the connecting-wire A at or near its junction with the platina D, to prevent the accumulation of salts thereon, and to secure a more perfect way of covering the platina with carbon.

The general structure of my connections will be readily comprehended from the drawings.

Being provided with the ordinary connecting-wire A, with the strip of platina closely fastened to one end of it, I proceed to cover the junction of the two, and all that portion of A near the platina, with lead, hard rubber, or some suitable inoxidizable substance not permeable by the liquid in the battery-cups.

The carbon C is provided with an opening drilled nearly through it longitudinally, corresponding in shape and diameter to the covering B. Into this recess in the carbon the connecting-wire A, prepared as above, is forced with as much pressure as the carbon will allow.

When the conductor A is thus securely protected and in contact with the platina, the platina pressing constantly upon the carbon C at a point always below the surface of the actuating liquid in the porous cup E, the battery will present a constancy of action.

A constant source of difficulty heretofore has been the destruction of the solder that fastened the platina to the conducting-wire by the action of the acid in the cups, and this was quite as likely to take place when the carbons were being soaked in water to renew them as when in the battery.

My method of covering the junction of the platina and the conducting-wire A entirely obviates this difficulty, which has been not only a source of frequent obstruction to the galvanic current, but has kept up a constant call for repairs. Thus, while there may be more or less formation of salts within the pores of the carbon C, the covering B will prevent its accumulation upon the surface of the wire A—a very serious objection, and one from which constant annoyance and frequent delays are experienced.

As the platina is always entirely immersed in the liquid of the battery-cups, there can be no drying of the salts thereon—consequently no obstruction of the galvanic current from this source—a desideratum so long sought for in vain.

Moreover, with my manner of combining the parts, if either by oversight in the manufacture or careless use the perfect junction of the wire A with the platina D should be found wanting, the covering B, being a conductor, will keep up the action of the battery until the examination ordinarily given to batteries in use will lead to the discovery of the threatened defect.

What I claim as my invention, and desire to secure by Letters Patent, is—

Surrounding the junction of the wire A with the platina, and a portion of the said wire A with the covering B, or its equivalent; also, the combination of the carbon with the said covering B and platina D, substantially as described, and for the purposes set forth.

AARON S. OGDEN.

Witnesses:
DANIEL C. CALLEY,
LOUIS MAURY.